Figures 1, 2, 3, 4:
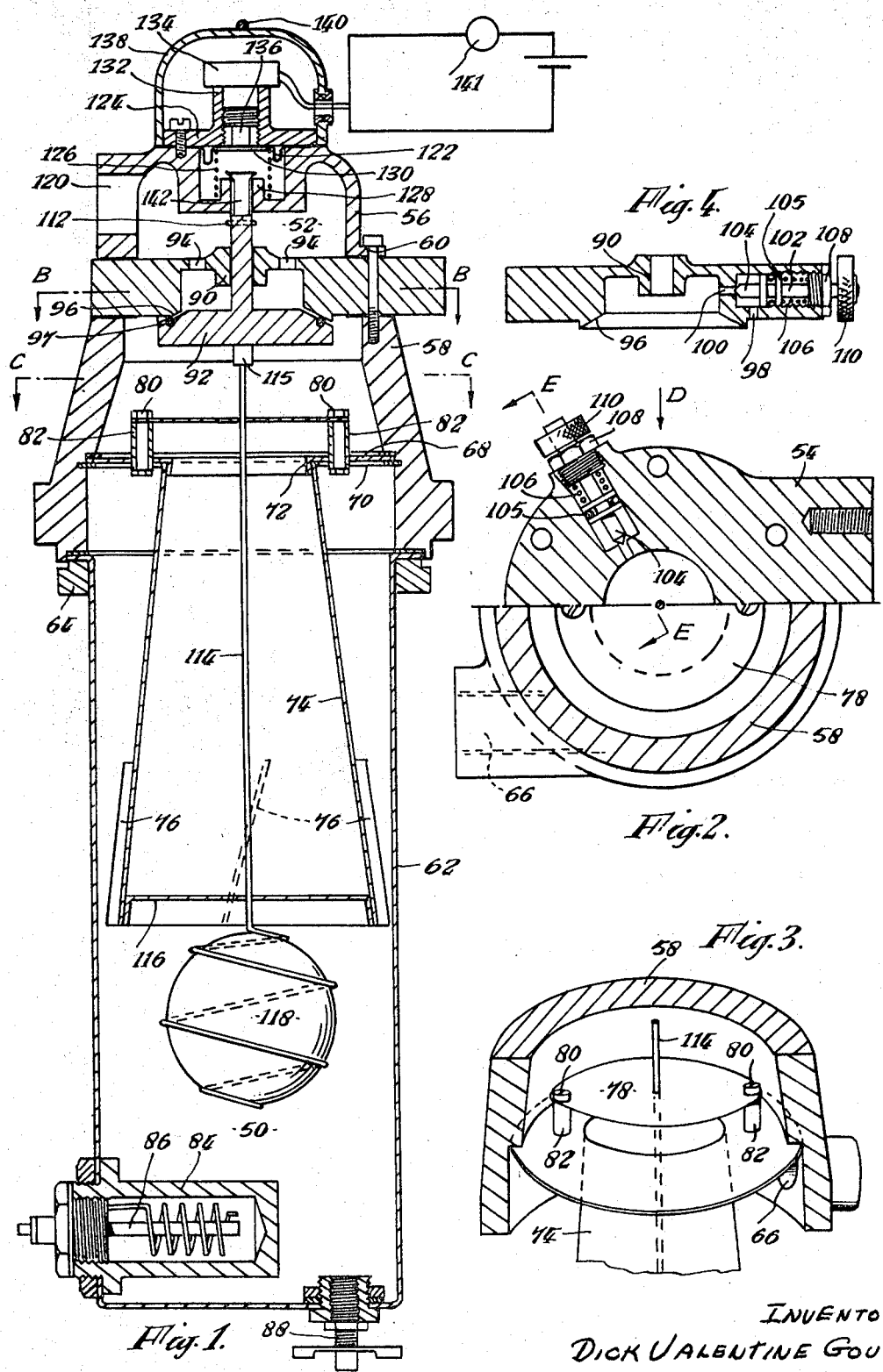

United States Patent

[11] 3,542,194

[72] Inventor Dick Valentine Gough
 Fareham, England
[21] Appl. No. 854,079
[22] Filed Aug. 29, 1969
 Continuation-in-part of Ser. No. 706,123,
 Feb. 16, 1968, abandoned.
[45] Patented Nov. 24, 1970
[73] Assignee Plough (Contracts) Limited
 Stonehouse, England
 a company of Great Britain and Northern
 Ireland a part interest
[32] Priority Aug. 30, 1968
[33] Great Britain
[31] No. 41,589/68

[54] LIQUID SEPARATORS
 14 Claims, 5 Drawing Figs.
[52] U.S. Cl. .................................................. 210/90,
 210/123, 210/304
[51] Int. Cl. .................................................. B01d 27/10
[50] Field of Search ..................................... 210/84, 86,
 90, 91, 93, 311, 312, 115, 114, 119, 123, 304, 306, 512

[56] References Cited
UNITED STATES PATENTS

| | | | |
|---|---|---|---|
| 2,170,074 | 8/1939 | Hewitt | 210/304X |
| 2,204,998 | 6/1940 | Ryan et al. | 210/86X |
| 2,781,910 | 2/1957 | Fontein | 210/512X |
| 2,983,384 | 5/1961 | Winslow | 210/304X |
| 3,303,895 | 2/1967 | Fontenot | 210/512X |
| 3,364,658 | 1/1968 | Walker | 210/114X |
| 3,378,993 | 4/1968 | Veres et al. | 210/304X |
| 3,386,581 | 6/1968 | Gough | 210/90X |

FOREIGN PATENTS

| 616,170 | 3/1961 | Canada | 210/304 |
|---|---|---|---|

Primary Examiner—Samih N. Zaharna
Attorney—Jacobs and Jacobs

ABSTRACT: A separatory device is provided for separating constituents from liquid-liquid or liquid-solid mixtures such as removing water and/or grit from diesel fuel. This is effected by a partitioned casing having upper and lower chambers with the partition therebetween being valve-controlled and the denser constituent being accumulated in the lower chamber which is divided into float-controlled regions.

Patented Nov. 24, 1970

3,542,194

Sheet 1 of 2

INVENTOR
DICK VALENTINE GOUGH
By Jacobs & Jacobs

INVENTOR
DICK VALENTINE GOUGH
By Jacobs & Jacobs

LIQUID SEPARATORS

This application is a continuation-in-part of U.S. Pat. application Ser. No. 706,123 filed Feb. 16, 1968 and now abandoned.

This invention relates to devices for separating a constituent or constituents from a mixture of liquids or of liquids and solids, for example, for the removal from diesel fuel of water and/or grit.

Liquid separators are known that operate by allowing settling of a denser constituent to occur under gravity in a chamber and a float valve is closed by the settle material as it collects so that the material is prevented from reaching the separator outlet. However, if the flow rate through the chamber increases beyond a certain point, the velocity of the mixture causes turbulence inhibiting separation and hence results in inefficient operation of the device. It is an object of the invention to provide a form of separator that does not rely solely upon gravity to separate the constituents of the mixture so that relatively high rates of flow can be maintained through the separator, as compared with known gravity separation devices, without impairing its efficiency.

In apparatus according to the invention, a casing is divided by a valve-controlled partition into upper and lower chambers which have, respectively, the outlet and inlet connections of the apparatus and float means are provided in the lower chamber to close the valve with accumulation of a denser constituent there, said lower chamber being divided into upper and lower regions communicating through a conduit extending downwardly into the lower region and through which the float means projects, the conduit having a lower end spaced from the bottom of the chamber and its cross-sectional area at said lower end occupying a substantial part of the cross-sectional area of the chamber at the same level, said inlet connection being located in an upper end of the lower chamber above said conduit lower end, whereby the flow through the chamber is directed downwardly between the conduit and the chamber walls and is then drawn upwardly through the conduit so permitting a denser constituent of the mixture to settle in the bottom region of the chamber below the conduit.

Preferably, filter means are disposed in the conduit means across the path of the flow therethrough. To provide a relatively large area of filter material for the passage of the flow, the filtering surface preferably extends for at least a substantial part of the length of the conduit and, when the conduit has an upwardly tapering form, this surface may advantageously be given a downwardly tapering form, which may be frustoconical, an impervious end blanking piece then being disposed at the bottom edge of the filtering surface to prevent any bypassing flow through the bottom of the filter.

Figure 5:
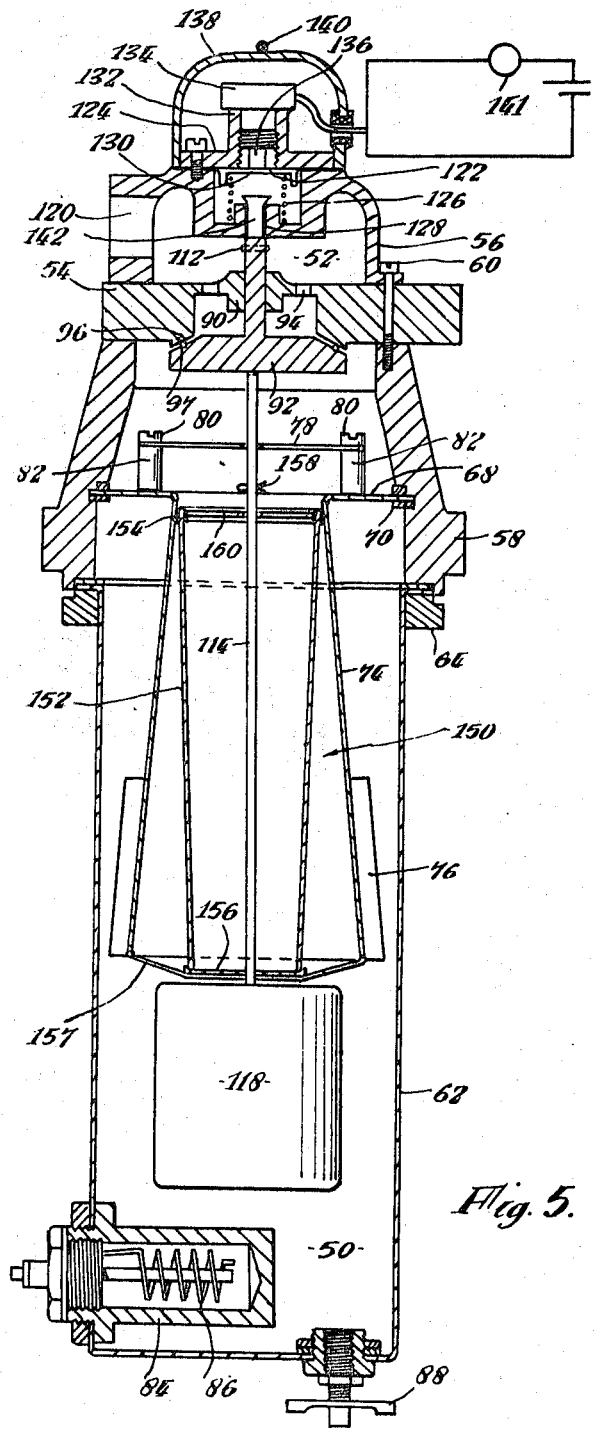

Two separators according to the invention, both intended for use in removing water and suspended solids from the fuel supply to a diesel engine, will now be described by way of example only and with reference to the accompanying drawings, wherein:

FIG. 1 is a vertical sectional view of a separator according to the invention,

FIG. 2 is a composite cross-sectional view, the upper half being on the line B-B and the lower half on the line C-C of FIG. 1, FIG. 3 is a perspective partly cutaway view of part of the separator as seen in the direction of the arrow D in FIG. 2, FIG. 4 is a sectional view of the partition on the line E-E of FIG. 2, and FIG. 5 is a vertical sectional view of another form of separator according to the invention.

Referring to FIGS. 1 to 4 of the drawing, the separator comprises upper and lower chambers 50, 52 separated by a partition 54. The upper chamber is formed by a dished member 56 and the lower chamber comprises a body member 58 to which the member 56 is secured by bolts 60 passing through the partition and a can 62 dependent from the body member 58. The can is detachably secured to the member 58 by pivoted bolts (not shown), lugs for these bolts being located on a mounting ring 64 secured to the can 62 at a top flange thereof.

An inlet passage 66 threaded to receive a connecting union joining it to the engine fuel tank is formed in the body member and is laterally offset with respect to the central axis of the member.

The body member 58 is provided with a shoulder locating a dividing member 68 held in position by a circlip 70. The dividing member has a downwardly turned flange 72 to which is fixed a frustoconical conduit 74 lying coaxially in the lower chamber and diverging towards its lower end. Four helical guide vanes 76 are fixed to the outer wall of the conduit, terminating substantially at its lower end and extending across the greater part of the radial space between the conduit and the can.

A baffle plate 78 is fixed to the dividing member above the upper end of the conduit by two bolts 80 passing through holes in the dividing member and through tubular spacers 82 which hold the plate at a distance from the member.

In its lower region the can has a heater tube 84, within which an electrical heater 86 is located, and a drain tap 88.

The partition 54 between the chambers has a boss 90 forming bearing means for the stem of a closure valve 92. In a recess in the partition around the boss are formed holes 94 so that the upper chamber may be placed in communication with the lower chamber. From the lower rim of the recess extends a frustoconical seat 96 for the sealing ring 97 of the closure valve. The partition is also formed with a bleed passage bypassing the valve 92 and comprising two communicating bores 98 and 100 extending respectively upwardly from the lower face of the partition below the valve seat and outwardly from the recess above the valve seat.

The bores 98, 100 may be isolated from each other by a bypass valve 102 having a conically tipped shaft 104 having an O-ring seal 105 and urged against the end of the bore 100 by a spring 106 the outer end of which bears against a screwed plug 108 in which the shaft 104 is a sliding fit. The outer end of the shaft 104 carries a knurled knob 110 by means of which the shaft can be pulled outwards against the spring force to open the bleed passage.

The stem of the valve 92 has a circlip 112 to limit its downward travel. A rod 114 carries a ferrule 115 on its upper end which bears against the head of the valve and passes freely through holes in the baffle plate and a plate 116, foxed in the lower end of the conduit, to a cage formed at its lower end in which is located a plastics float 118. The plate 116 is formed with perforations to permit the passage of liquid into the conduit. The dished member 56 is formed with an outlet passage 120 threaded to receive a connecting union and has an upwardly open circular recess on its top face. The recess is closed at its upper end by diaphragm 122 the edge of which is sandwiched between a switch support plate 124 and the dished member. The free central region of the diaphragm is urged upwardly by a spring 126 which has one end located on a central spigot 128 and bears at its other end upon a disc 130 interposed between it and the diaphragm.

A hollow central pillar 132 of the switch support plate is threaded at the lower end of its bore for the fixing of an electrical switch 134 whose movable member 136 bears upon the upper side of the diaphragm. The switch and its support plate are covered by a dome 138 held in position by a spring clip 140. The switch is connected in a circuit, shown diagrammatically, with a visual and/or audible warning device 141 which may be in the vehicle cab to indicate to the driver accumulation of water in the can above a predetermined level.

In operation, the mixture of fuel and suspended impurities enters through the inlet passage 66 and is constrained to pass downwardly between the outer wall of the conduit 74 and the inner wall of the lower chamber 52 of the separator. The offset of the inlet passage with respect to the conduit causes a swirling motion to be imparted to the flow and this is augmented by the guide vanes 76. Due to the diminishing area available for the flow as it passes downwards the velocity increases and the denser constituent is urged towards the wall of the chamber by an increasing centrifugal force. As the material passes the end of the conduit the area available for flow is abruptly increased, and the velocity of flow correspondingly decreased, reducing any tendency for the separated heavier constituent at the wall to be remixed with the main body of liquid, which is drawn upwards into the conduit, and the flow through the filter will pass the open valve 92 to reach the outlet 120. The filter will prevent the passage of lighter solid particles and can also provide a second separation stage for small water droplets if the filter material is suitably chosen.

As the level of separated water (and any settled solid matter) rises in the lower chamber it reaches the valve float 118 and at a predetermined level the additional buoyancy force resulting from the greater density of the water begins to lift the valve until the valve sealing ring 97 is held against the seat 96 to stop flow into the upper chamber.

A tufnol poppet valve 142 fits loosely in a bore in the spigot 128 of the dished member and may be lifted off its seat in the upper end of the bore by the stem of the valve 92 as it rises. As the engine pump continues to draw fuel from the upper chamber of the separator a fall in pressure in the outlet line and upper chamber occurs. This fall in pressure draws the valve against its seat and is transmitted to the lower side of the diaphragm 122 which is drawn downwards against the action of the spring 126 and the movable member 136 of the switch also moves down to close the circuit and actuate the warning means.

The driver will then draw off the accumulated water by holding open the drain tap until fuel flows from the tap. However, the valve 92 will still be held against its seat by the lower pressure in the upper chamber, and before fuel flow can be reestablished the valve must be released by pulling out the knob of the bypass valve 102 to allow fuel to be drawn into the upper chamber through the bleed passage 100 and thus equalise the pressures on either side of the valve 92. The valve will now fall from its seat, since the float is immersed in fuel which is not sufficiently dense to buoy up the valve. Upon release of the bypass valve knob 110 the spring will urge the valve back to seal the bleed passage.

In operation the fuel demand of the engine may on occasions be subject to relatively rapid changes causing pressure variations in the fuel line. The poppet valve 142 operates as an antisurge device to prevent fluctuations in pressure in the upper chamber from operating the switch and giving a false indication of closure of the main valve 92.

The separator is adapted to deal with relatively large flows of fuel and as a result the flow from the upper end of the conduit 74 may have considerable momentum. The baffle plate 78 prevents this flow from impinging directly upon the bottom face of the main valve as the valve might then be lifted by the momentum of the liquid to its closed position.

Referring now to FIG. 5 of the drawings, the apparatus shown here is similar in many respects to the preceding embodiment. Parts common to both bear the same reference numbers and will not be further described.

Within the conduit 74 there is located a filter 150 comprising a frustoconical filter sheet 152, which may be of sintered metal or of a conventional filter material such as paper. The upper end of the filter seats against the conduit with the interposition of a soft nitrile rubber jointing ring 154 and the lower end of the filter is closed by an end blanking cap 156. The filter is held in the conduit by a spring U-clip 157 hinged to one side of the conduit and engageable with recesses (not shown) on the other side of the conduit when securing the filter in place.

The rod 114 carrying a modified form of the float 118 can bear with its upper end against the head of the valve 92 and is centrally located by a wire guide 160 in the upper end of the filter. The rod passes freely through a hole in the baffle plate 78 through which it can be withdrawn when the filter is removed for cleaning or replacement. In order to prevent the rod dropping from the plate 78 if the float 118 is not buoyed up by the surrounding liquid, the rod carries a split pin 158 that is supported upon the guide 160 when the float drops. Thus, when the can 62 is removed, disengagement of the clip 157 allows the filter 150 to be removed together with the float assembly 118, 114, 158. The stem of the valve has a circlip 112 to limit its downward travel when not supported by the rod.

It is to be noted that by employing the full length of the conduit 74 for the filter 150 a relatively large filtering surface is provided. This is assisted by tapering the filter only slightly so that it has a considerable peripheral extent, even at its bottom edge; this arrangement can nevertheless leave free a relatively large internal cross-sectional area at the entry to the conduit to allow the slowing of flow conductive to separation of denser particles as the incoming material passes the bottom edge of the conduit from the upper region of the chamber 50.

A feature of the illustrated arrangement is that when the filter sheet 152 becomes clogged with impurities to such an extent as to significantly restrict flow therethrough, there will be a reduction in pressure in the upper chamber 52 that will eventually cause the warning device 141 to operate. The valve 142 will not prevent this happening since it is provided as an antisurge device and can permit a very restricted passage of fluid when it is in the closed position. Thus, the warning circuit also provides an automatic indication of the need to clean or replace the filter.

Although the illustrated embodiments of the invention have been described in operation for removing impurities from diesel fuel, it is obvious that a separator according to the invention may be used to separate constituents of different densities from many other mixtures, including denser solids from liquids, for example grit from oil.

I claim:

1. Apparatus for separating constituents of a mixture of liquids or liquids and solids of different densities comprising, in combination, upper and lower chambers, a partition separating said chambers, a dividing member within the lower chamber intermediate its height, an opening in said member and a conduit extending downwardly from said opening, the lower end of the conduit being spaced from the bottom of the lower chamber and having a cross-sectional area occupying a substantial part of the cross-sectional area of the chamber at the same level, a liquid inlet of the apparatus in the lower chamber being disposed below and adjacent the dividing member, an outlet being disposed in the upper chamber and a liquid passage being provided in the partition between the chambers whereby the flow from the inlet is directed downwardly through the space between the conduit and the lower chamber and is then drawn upwardly through the conduit so permitting a denser constituent of the mixture to settle in the bottom region of the lower chamber below the conduit, a valve in the lower chamber being displaceable to close said partition passage, float means in the lower chamber being arranged to displace said valve to a closing position upon accumulation of said denser constituent in the lower chamber below the conduit and so prevent the entry of further liquid into the lower chamber.

2. A separator according to claim 1 wherein a baffle plate is provided in the path of the flow between the conduit and the valve passage in the partition.

3. Apparatus according to claim 1 further including external indicator means to provide a signal indicating closure of the valve, said means comprising, in combination, an actuator, an aperture leading to said actuator from the upper chamber, an obturator device at said aperture being displaceable by the valve when the valve passage is closed to place said actuator in communication with the upper chamber whereby a pressure drop in the upper chamber is transmitted to said actuator, external circuit means connected to said actuator being operable by the sensing of said pressure drop at the actuator.

4. Apparatus according to claim 1 further comprising filter means disposed within the downwardly extending conduit across the path of the flow therethrough.

5. Apparatus according to claim 4 wherein a filtering surface of the filter means extends for at least a substantial part of the length of said conduit.

6. Apparatus according to claim 5 wherein the filtering surface extends over substantially the whole length of the conduit and has a closed form cross section that occupies a progressively larger proportion of the cross-sectional area of the conduit with increasing distance from the conduit lower end, an upper end of the filtering surface having a boundary that is close to or in contact with the conduit wall at that level.

7. Apparatus according to claim 4 wherein a filtering surface of the filter means has a closed form cross section transverse to the axial extent of the conduit, the area of said form relative to the cross-sectional area of the conduit in a corresponding plane being progressively greater with increasing distance from the lower end of the conduit.

8. Apparatus according to claim 7 wherein the conduit has an upwardly tapering form and the filtering surface has a downwardly tapering form.

9. Apparatus according to claim 7 wherein the filtering surface has a substantially frustoconical form and an impervious end blanking piece is disposed at a bottom edge of said surface.

10. Apparatus according to claim 4 wherein the float means passes through the filter means and releasable attachment means are provided for the removal of the filter means from the apparatus together with the float means.

11. Apparatus according to claim 4 further including external indicator means to provide a signal indicating blockage of the liquid flow, said means comprising, in combination, an actuator, conduit means between said actuator and the upper chamber permitting restricted communication to the actuator of pressure variations in the upper chamber, external electrical circuit means connected to said actuator, being operable by the sensing of said pressure drop at the actuator to indicate the closure of said partition valve or the blocking of the filter means by collected impurities.

12. Apparatus according to claim 11 wherein an obturator device is provided at said conduit means and is displaceable with the partition valve upon closure of the valve to reduce the restriction of said communication between the upper chamber and the actuator.

13. A separator for removing a denser constituent from a mixture of said constituent in a carrier liquid comprising, in combination, upper and lower chambers, a partition between said chambers, an aperture in the partition and a closure valve movable to close said aperture, a dividing member in the lower chamber adjacent said valve and having a central opening, a conduit extending downwardly from said opening having a frustoconical form widening towards its lower end to a cross-sectional area occupying a substantial part of the cross-sectional area of the lower chamber at the same level, inlet means for the mixture into said lower chamber adjacent and below the dividing member and offset from the central axis of the conduit to cause a swirling motion in the flow of the mixture in the space between the conduit and the chamber, guide means in the path of said flow adjacent the lower end of the conduit to augment said swirling motion, outlet means in the upper chamber for the upwards flow through the conduit and the closure valve, a settling region in said lower chamber below the conduit for a denser constituent of the mixture separated from said swirling flow and drain means in said region for removal of said constituent from the chamber, float means depending into said settling region arranged to operate the closure valve whereby accumulation of said separated constituent therein raises the float means to close the valve and isolate the upper and lower chambers, a diaphragm actuator in communication with the upper chamber actuable by a pressure drop therein caused by continued withdrawal of liquid from the upper chamber after closure of the valve, external warning means connected to said actuator to be operated thereby to indicate said pressure drop, and externally operable valve release means at said partition for reopening of the valve against a closure force exerted by said pressure drop in the upper chamber.

14. A separator according to claim 13 further comprising a filter member disposed within the downwardly extending conduit across the path of the flow therethrough and having a form that tapers towards its lower end.